United States Patent

Cortes Guasch et al.

[11] Patent Number: 6,070,950
[45] Date of Patent: Jun. 6, 2000

[54] BRAKE REGULATOR WITH IMPROVED JOINT

[75] Inventors: Esteve Cortes Guasch; Juan Simon Bacardit; Fernando Sacristan, all of Drancy, France

[73] Assignee: Bosch Systemes de Freinage, Drancy, France

[21] Appl. No.: 08/817,730

[22] PCT Filed: Apr. 3, 1997

[86] PCT No.: PCT/FR97/00594

§ 371 Date: Apr. 10, 1997

§ 102(e) Date: Apr. 10, 1997

[87] PCT Pub. No.: WO97/46432

PCT Pub. Date: Dec. 11, 1997

[30] Foreign Application Priority Data

Jun. 5, 1996 [FR] France ................................. 96 06909

[51] Int. Cl.[7] .................................................. B60T 11/34
[52] U.S. Cl. ........................................ 303/9.75; 303/9.69
[58] Field of Search ................................. 303/9.69, 9.75, 303/9.62

[56] References Cited

U.S. PATENT DOCUMENTS 3,992,063  11/1976  Falk ........................................ 303/9.75
4,615,566  10/1986  Perrin ..................................... 303/9.69
4,624,507  11/1986  Carre et al. .............................. 303/56
4,982,999   1/1991  Rossigno et al. ....................... 303/9.75

FOREIGN PATENT DOCUMENTS 2071244  9/1981  United Kingdom .................. 303/9.75
2131107  6/1984  United Kingdom .................. 303/9.75

Primary Examiner—Matthew C. Graham
Attorney, Agent, or Firm—Lee H McCormick, Jr.; Warren Comstock

[57] ABSTRACT

A braking control valve having a housing with at least one bore and a hydraulic piston (12) which slides in the bore to define and inlet chamber and an outlet chamber. The inlet and outlet chambers being sealed from each other by an elastic annular seal (14) which is carried by the piston (12). The inlet and outlet chambers are in communication with each other through a one way valve located in a passage in the piston which is actuated by a tappet. The seal (14) substantially has a rectangular cross section which is filled without axial clearance in a groove (120) in the piston (12). The seal has internal recesses which are exposed to any pressure present in the inlet chamber so as to urge the seal (14) against the bore with a force which varies as the inlet pressure in the inlet chamber.

1 Claim, 2 Drawing Sheets ary seal surrounding the piston and capable of
BRAKE REGULATOR WITH IMPROVED JOINT The present invention relates to a braking control valve for interposition between a source of hydraulic pressure and a brake circuit of an automobile vehicle and comprising: a housing provided with at least one bore; a hydraulic piston sliding in this bore and defining therein first and second pressure chambers sealed from each other by means of an elastic annular seal surrounding the piston and capable of communicating selectively with each other through a one way valve installed in a passage in the piston, the first and second chambers being connected in use respectively to the source of pressure and to the brake circuit; and a tappet acting on the one way valve in a direction such as to enable it to open when a relatively low pressure exists in the second chamber, whereas the piston slides axially in the bore under the influence of an increase in pressure in the second chamber in a direction such as to enable the one way valve to close.

BACKGROUND OF THE INVENTION

Braking control valves are well known in the prior art, as illustrated for example in the patent documents U.S. Pat. Nos. 4,615,566, 4,624,507, and EP 0 223 641, and enable a modified braking pressure to be developed at their outlet and applied to the rear brakes of a motorised vehicle which is related to the braking pressure applied both to their inlet and to the front wheels of the vehicle, but is nonetheless lower than the front wheel braking pressure at values greater than a defined threshold value.

One of the problems encountered in the design of such control valves resides in the difficulty of obtaining the desired variation of the outlet pressure relative to the inlet pressure and, more precisely, of avoiding that the relationship between the outlet pressure and the inlet pressure contains an anomaly, or "flat", corresponding to a more or less local defect in the variation of the outlet pressure.

SUMMARY OF THE INVENTION

In this context, the invention has as object to provide a control valve which is free from any anomaly of this kind and resides in the dual virtue of having identified the cause of this anomaly and having provided a remedy for it.

To this end, the braking control valve of the invention is characterised essentially in that the annular seal is fitted without axial clearance in a groove which is formed in the piston and which comprises a first bearing surface of circular ring shape on the side of the first chamber, a second bearing surface also of circular ring shape on the side of the second chamber, and a cylindrical bottom surface connecting the first and second bearing surfaces, the groove thus presenting a rectangular cross section, in that the seal presents a circumference which is at least partially cylindrical and which makes contact between the seal and the bore, in that the seal presents an annular zone which is also of circular ring shape facing the second bearing surface by means of which it lies flat on the second bearing surface, and in that the seal presents at least relative to the first bearing surface and to the cylindrical bottom surface recesses communicating with the first chamber to enable the pressure existing in the first chamber to deform the seal radially by urging it against the bore.

In accordance with the simplest embodiment envisaged, the seal is symmetrical relative to a median plane, while the first and second bearing surfaces of the groove have different external radiuses, and the annular zone presents an internal radius which is greater than the external radius of the first bearing surface and less than the external radius of the second bearing surface.

Other features and advantages of the invention will appear clearly from the following description, given by way of indication and not by way of limitation, with reference to the accompanying drawings.

DETAILED DESCRIPTION OF THE INVENTION

Figure 1:
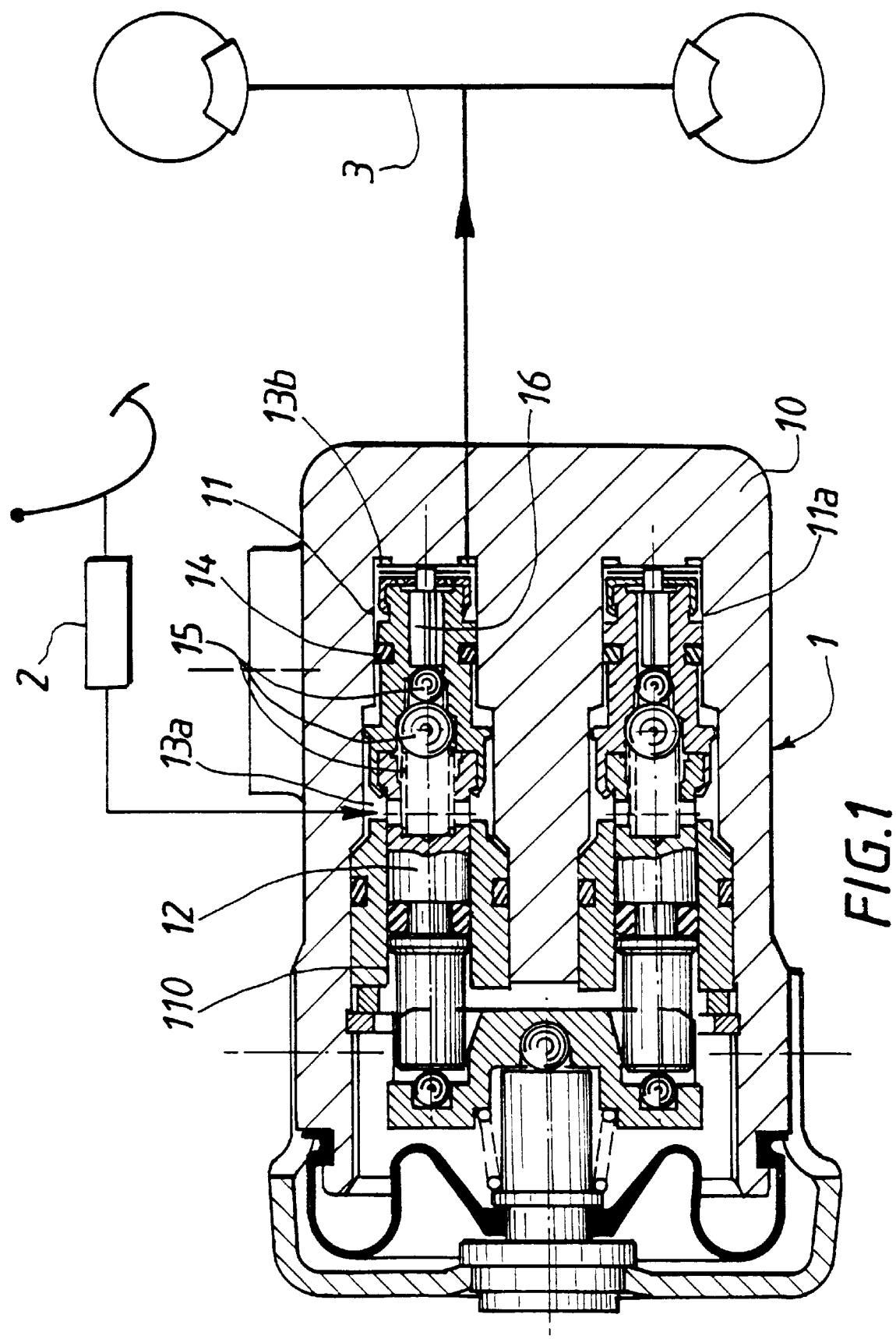
FIG. 1 is an overall sectional view of a control valve in accordance with the invention.
Figure 2:
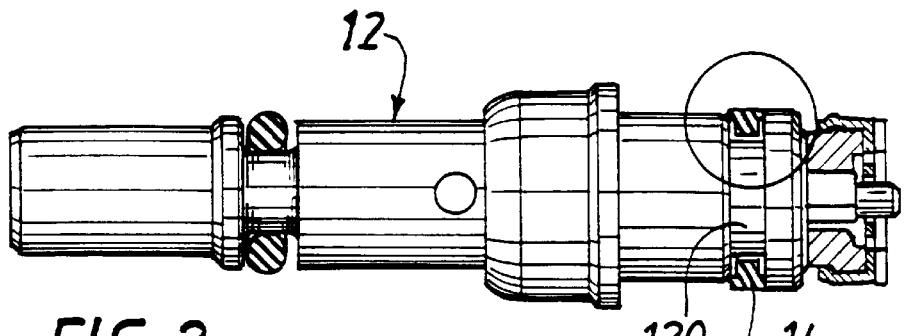
FIG. 2 is an enlarged view showing the piston of the control valve of FIG. 1.
Figure 3:
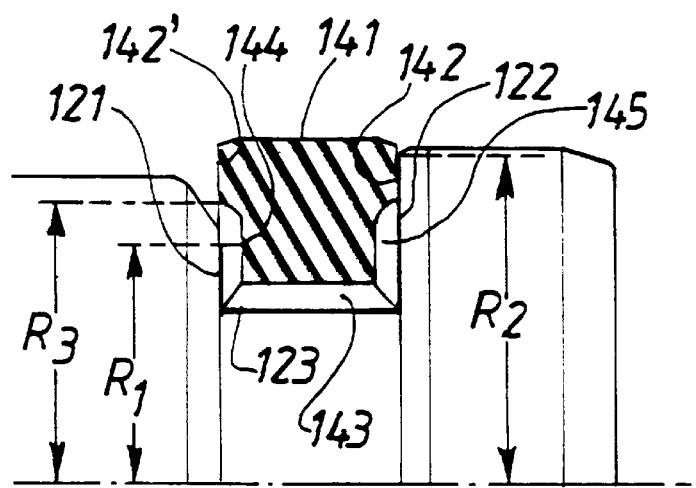
FIG. 3 is an enlarged detail view of the part circled in FIG. 2.
Figure 4:
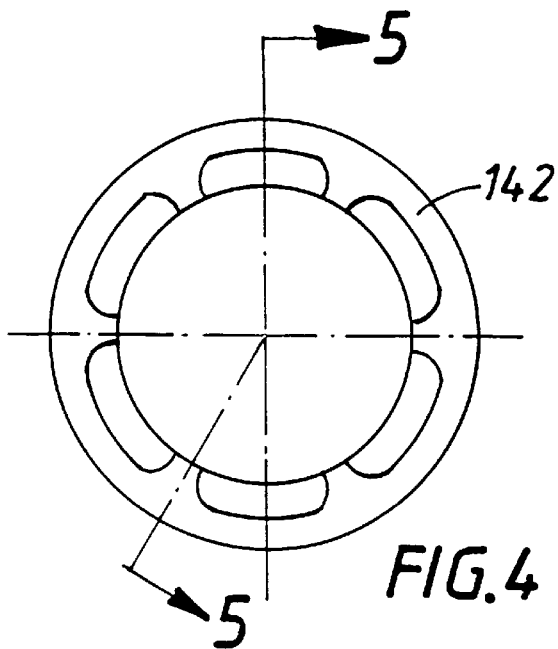
FIG. 4 is a plan view of the piston seal.
Figure 5:
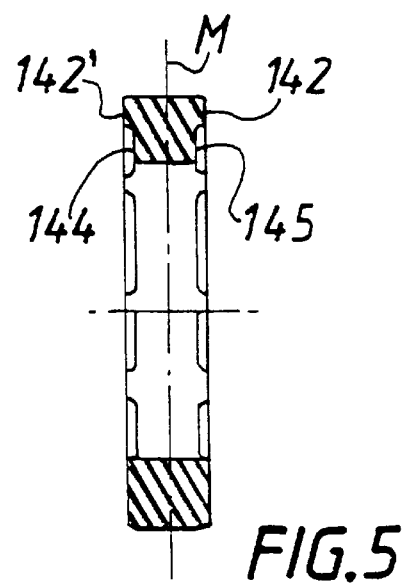
FIG. 5 is a sectional view of the piston seal, taken along the line 5—5 of FIG. 4.

As shown in FIG. 1, the invention relates to a braking control valve 1, designed to be interposed between a source of hydraulic pressure, such as a master cylinder 2, and the rear brake circuit 3 of an automobile vehicle, in such a way as to supply to the rear brake circuit 3 a pressure equal to the outlet pressure of the source of pressure for low values of this pressure, and a pressure lower than that of the source for higher values of the source pressure.

The control valve comprises, in the conventional way, a housing 10 provided with at least one bore 11, a hydraulic piston 12 sliding in this bore and defining therein first and second pressure chambers 13a and 13b, sealed from each other by means of an elastic annular seal 14 surrounding the piston, the chambers being capable of selective communication with each other through a one way valve 15 installed in a passage in the piston 12.

In the embodiment shown in FIG. 1, the control valve in fact comprises two bores 11 and 11a, the components disposed in the bore 11a being exactly similar in position and structure to those disposed in the bore 11.

In operation, the first and second chambers 13a, 13b are connected respectively to the source of pressure 2 and to the brake circuit 3.

A tappet 16 bearing on the housing 1 acts on the one way valve 15 in the direction such as to open the valve when a relatively low pressure exists in the second chamber 13b, and the piston 12 slides axially in the bore 11 under the influence of an increase in the pressure in the second chamber 13b in a direction such as to enable the one way valve to close.

To this end, in accordance with a conventional design, the piston 11 is for example a differential piston which presents to the first chamber 13a on the side opposite to the second chamber 13b a pressure surface area defined by a bore 110 which is smaller than the pressure surface area defined by the bore 11.

A shown in FIG. 1, the one way valve 15 may comprise a plurality of balls urged by springs in a direction towards both the tappet 16 and the respective seats formed in the passage in the piston.

In accordance with the invention, the annular seal 14 is fitted without axial play in a groove 120 which is formed in the piston 12 and which comprises a first bearing surface 121 in the shape of a circular ring on the side of the first chamber 13a, a second bearing surface 122 also in the form of a circular ring on the side of the second chamber 13b and a cylindrical bottom surface 123 connecting the first and second bearing surfaces, so that the groove thus presents a rectangular cross section.

Moreover, the seal 14 presents: a circumference 141 which is at least partially cylindrical and which makes contact between the seal and the bore 11, an annular zone 142 also in the shape of a circular ring disposed facing the second bearing surface 122 and by which it lies flat on this second bearing surface, and recesses such as a radial clearance 143 and channels 144, 145, arranged at least facing the first bearing surface 121 and the cylindrical bottom surface 123, these recesses communicating with the first chamber 13a to enable the pressure existing in this first chamber to deform the seal 14 radially by urging it against the bore 11.

According to the simplest embodiment of the invention, the seal 14 is symmetrical relative to a median plane M.

In this case, the first and second bearing surfaces 121, 122 of the groove are preferably of different external radiuses R1, R2 and the annular zone 142, 142' presents an internal radius R3 which is greater than the external radius R1 of the first bearing surface 121 and less than the external radius R2 of the second bearing surface 122.

We claim:

1. A braking valve for interposition between a source of hydraulic pressure and a brake circuit of an automobile vehicle and comprising:

a housing provided with a least one bore;

a hydraulic piston sliding in said bore and defining therein first and second pressure chambers sealed from each other by means of an elastic annular seal surrounding said piston said first and second pressure chambers being capable of communicating selectively with each other through a one way valve installed in a passage in said piston, said first and second chambers being connected in use respectively to the source of hydraulic pressure and to the brake circuit; and a tappet acting on the one way valve in a direction such as to enable it to open when a relatively low pressure exists in said second chamber, whereas said piston slides axially in said bore under the influence of an increase in pressure in said second chamber in a direction such as to enable said one way valve to close, characterised: in that said annular seal is fitted without axial clearance in a groove which is formed in said piston, said annular seal comprising a first bearing surface having a first circular ring shape on a side adjacent said first chamber, a second bearing surface having a second circular ring shape on a side adjacent said second chamber, and a cylindrical bottom surface connecting said first and second bearing surfaces, said groove thus presenting a rectangular cross section; and in that said seal presents a circumference which is at least partially cylindrical and which makes contact between said seal and said bore; in that said seal presents an annular zone which has a circular ring shape facing said second bearing surface by means of which said seal lies flat on the second bearing surface; in that said seal presents at least relative to said first bearing surface and to said cylindrical bottom surface recesses communicating with said first chamber to enable any pressure existing in said first chamber to deform said seal radially by urging in that said seal against said bore, said seal being symmetrical relative to a medium plane; and in that said first and second bearing surfaces of said groove have different external radiuses and in that said annular zone presents an internal radius which is greater than an external radius of said first bearing surface and less than an external radius of said second bearing surface.

* * * * *